(12) United States Patent
Trautenberg

(10) Patent No.: US 8,179,309 B2
(45) Date of Patent: May 15, 2012

(54) METHOD AND APPARATUS FOR THE OPTIMIZATION OF STATUS MESSAGES IN A SATELLITE NAVIGATION SYSTEM

(75) Inventor: Hans L. Trautenberg, Ottobrunn (DE)

(73) Assignee: Astrium GmbH, Taufkirchen (DE)

( * ) Notice: Subject to any disclaimer, the term of this patent is extended or adjusted under 35 U.S.C. 154(b) by 235 days.

(21) Appl. No.: 12/552,073

(22) Filed: Sep. 1, 2009

(65) Prior Publication Data

US 2010/0052979 A1    Mar. 4, 2010

(30) Foreign Application Priority Data

Sep. 2, 2008  (DE) .................. 10 2008 045 323

(51) Int. Cl.
*G01S 19/02*    (2010.01)
(52) U.S. Cl. ................................. 342/357.395
(58) Field of Classification Search ............ 342/357.395
See application file for complete search history.

(56) References Cited

U.S. PATENT DOCUMENTS

| | | | |
|---|---|---|---|
| 2005/0015680 A1* | 1/2005 | Rubin et al. ............... | 714/47 |
| 2005/0122260 A1* | 6/2005 | Dunas et al. ............ | 342/357.02 |
| 2007/0225912 A1* | 9/2007 | Grush ...................... | 701/213 |
| 2008/0074318 A1 | 3/2008 | Trautenberg | |
| 2009/0135055 A1 | 5/2009 | Trautenberg | |

FOREIGN PATENT DOCUMENTS

| | | |
|---|---|---|
| DE | 10 2007 050 716 A1 | 4/2009 |
| WO | WO 2006/032422 A1 | 3/2006 |

OTHER PUBLICATIONS

Helmut Blomenhofer et al., "GNSS/Galileo Global and Regional Integrity Performance Analysis", ION GNSS 17th International Technical Meeting of the Satellite Division, Sep. 21-24, 2004, pp. 2158-2168, Long Beach, CA, XP-002415356.
Aiden Deem et al., "A Simulation Study for a Galileo External Regional Integrity System Configured for the Australasian Region", International Global Navigation Satellite Systems Society IGNSS Symposium 2007, Dec. 4-6, 2007, pp. 1-13, The University of New South Wales, Sydney, Australia, XP-002557633.
S. Journo et al., "Producing the Galileo Services From the Ground Mission Segment (GMS)", ION GNSS 19th International Technical Meeting of the Satellite Division, Sep. 26-29, 2006, pp. 504-519, Fort Worth, TX, XP-002521138.
European Search Report dated Dec. 9, 2009 with partial English translation (Seven (7) pages).
Helmut Blomenhofer, et al., "GNSS/Galileo Global and Regional Integrity Performance Analysis", pp. 1-10.

* cited by examiner

*Primary Examiner* — Harry Liu
(74) *Attorney, Agent, or Firm* — Crowell & Moring LLP

(57) ABSTRACT

In a method for optimization of status messages in a satellite navigation system, which comprises a space segment having a plurality of satellites that emit navigation signals to be received and evaluated by utilization systems for position determination, and a ground segment having a plurality of observation stations that monitor the satellites, a threshold value is determined, as a function of location, for a message indicating that the error of a satellite is no longer acceptable.

6 Claims, 1 Drawing Sheet

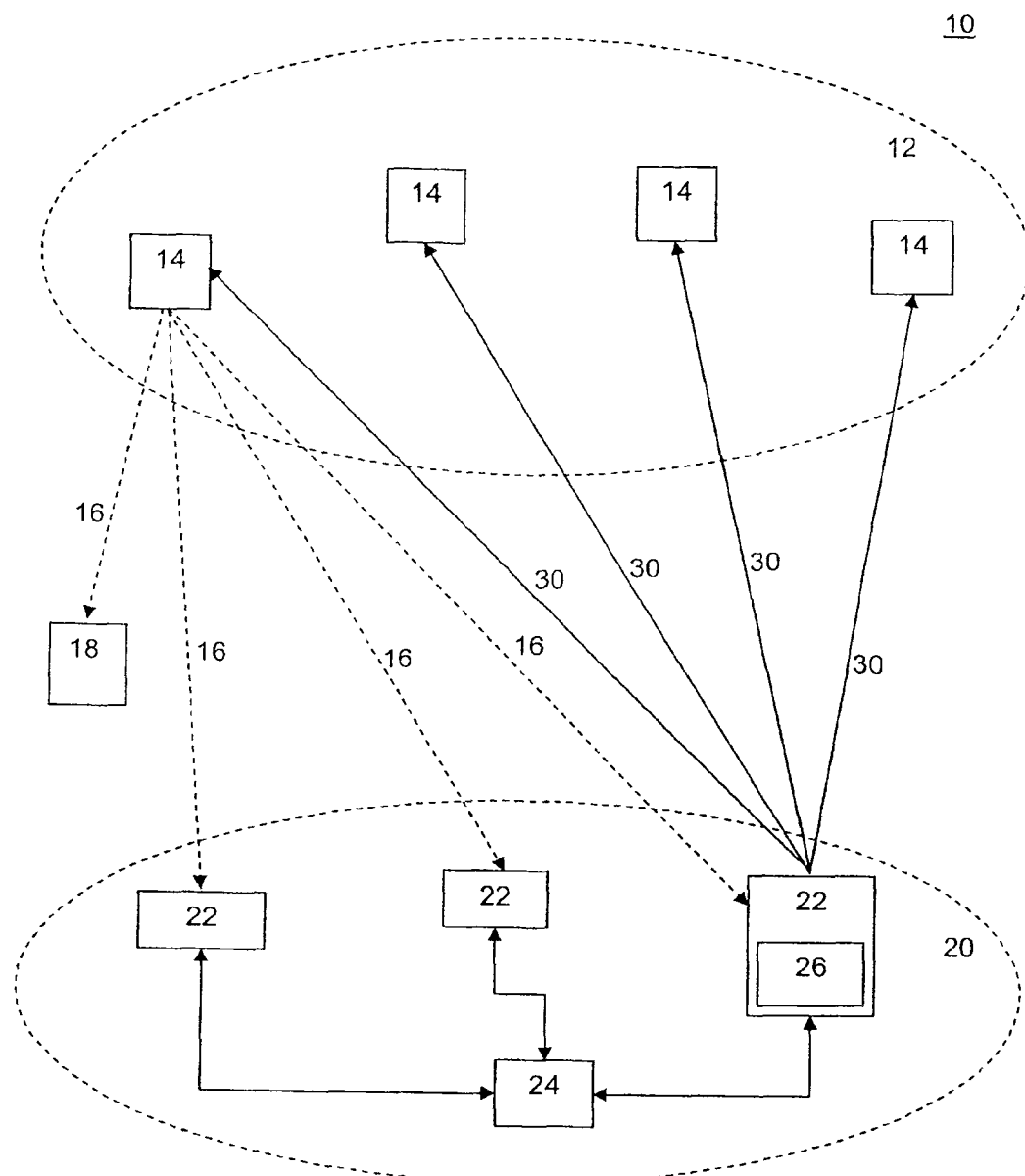

METHOD AND APPARATUS FOR THE OPTIMIZATION OF STATUS MESSAGES IN A SATELLITE NAVIGATION SYSTEM

This application claims the priority of German application 10 2008 045 323.4, filed Sep. 2, 2008, the disclosure of which is expressly incorporated by reference herein.

BACKGROUND AND SUMMARY OF THE INVENTION

This invention relates to a particular method and a particular apparatus for the optimization of status messages in a satellite navigation system.

A GNSS for global navigation (GNSS=Global Navigation Satellite System, or, in short, satellite navigation system) is used for position determination and for navigation on the ground and in the air. A GNSS such as the European satellite navigation system that is currently under construction (hereinafter also referred to as the Galileo system, or simply Galileo) comprises a satellite system (space segment) including a plurality of satellites, an earth-fixed receiving device system (ground segment), which is connected to a central calculating station and comprises a plurality of ground stations as well as Galileo sensor stations, and utilization systems, which evaluate and use the satellite signals transmitted by radio from the satellites for navigation.

In a GNSS, precise detection of a user's position requires local as well as global integrity. Integrity means, on the one hand, the capability of the GNSS to warn a user within a defined time period if parts of the GNSS should not be used for navigation, for example in the event of a failure of system components. On the other hand, integrity also means the trust a user can put in the reliability of the navigation data which he receives by way of satellite navigation signals from the satellites of the GNSS—particularly the precision of the navigation data received.

In the integrity concept of Galileo, it is planned to monitor each satellite from the earth-fixed receiving device system and to transmit corresponding message signals with respect to the behavior of each satellite to utilization systems. In particular, an estimated Signal-In-Space Accuracy (SISA) of a satellite, an estimated Signal-In-Space-Monitoring-Accuracy (SISMA), and, if needed, a simple error indication "Not OK" (the so-called Integrity Flag IF) in the event of a faulty satellite are intended to be transmitted to utilization systems. Furthermore, the threshold value for the message indicating that the error of a satellite is no longer acceptable, which threshold value is also referred to as IF threshold, is transmitted to the utilization systems. This threshold value is, inter alia, a function of SISA and SISMA. Both SISA and SISMA are independent of the user position in the integrity concept of Galileo. In Galileo, SISA and SISMA can be a function of the location of the satellite.

Galileo is also capable of monitoring the signal-in-space (SIS) within the ground segment using the measurements of the individual Galileo sensor stations. With the known positions of the Galileo sensor stations, the current position of a satellite and thereby the maximum error of the satellite or of the signal in space emitted by it (the so-called signal-in-space error (SISE)) can be estimated.

A prediction of the distribution of the SISE can be represented by a Gaussian distribution with the smallest standard deviation. This prediction is referred to as signal-in-space accuracy (SISA) as noted already. The SISA enables a description of the difference between the current 4-dimensional position (orbit and clock time) of the phase center of a satellite and the predicted 4-dimensional position of the phase center contained in a navigation message.

However, the estimate of the SISE is itself an error-laden process. As a rule, it is therefore assumed that the distribution of the current SISE around the value of the estimated SISE can be described by a Gaussian distribution with the standard deviation, which is referred to as the signal-in-space monitoring accuracy (SISMA). SISMA is therefore the precision of the estimate of the SISE for a satellite and is likewise transmitted to the utilization systems.

In the case of the previous concept of Galileo for the transmission of the SISMA, for each satellite, a scalar value is transmitted that is conservative and equal for every conceivable position of a utilization system (user position). When the equal, conservative scalar value is used for estimating an error, this use also results in a conservative estimate for generation of the status messages.

It is therefore an object of the present invention to make this estimate clearly less conservative than previously possible.

This object is achieved by a method for optimizing status messages in a satellite navigation system having the features claimed, and by an apparatus for optimizing status messages in a satellite navigation system having the features claimed. Additional features of the invention form the subject matter of the dependent claims.

One essential feature of the invention is that of introducing a location-dependent status message into a satellite navigation system, by virtue of which the estimate for the generation of status messages, which estimate, to date, has been conservative and equal for each location in the case of Galileo, can be better adapted to local conditions and thus substantially less conservative than in previous integrity concepts.

According to one embodiment, the invention relates to a method for optimizing status messages in a satellite navigation system, which includes a space segment comprising a plurality of satellites that emit navigation signals to be received and evaluated by utilization systems for position determination, and a ground segment, which includes a plurality of observation stations that monitor the satellites. A threshold value is determined, as a function of the location, for the message indicating that the error of a satellite is no longer acceptable. The location-dependent determination of the threshold value for the status message indicating that the error of a satellite is no longer acceptable enables the optimization of status messages so that they can be better adapted to local conditions. For example, status messages, and thus the efficiency of a satellite navigation system, over Europe can be adjusted in such a way that aircraft landings are enabled, whereas the status messages over oceans can be configured to achieve only efficiency for cross-country flights. On the whole, the efficiency of a satellite navigation system can thus be improved due to the location-dependent status messages. The method of the invention can be implemented in a utilization system in the form of an algorithm that optimizes the status messages of the utilization system, and in particular adapts the same to the current position of the utilization system.

The (user-) location-dependent or (when seen from the satellite) direction-dependent determination of the threshold value can include the use of (user-) location-dependent or (when seen from the satellite) direction-dependent error distribution functions for describing an error of the satellite signal. In the previous integrity concept of Galileo, in contrast, only one error distribution function is provided for all directions from which a utilization system can receive navigation signals of a satellite.

In particular, the location-dependent or (when seen from the satellite) direction-dependent determination of the threshold value includes the calculation of direction-dependent threshold values for the message indicating that the error of a satellite is no longer acceptable, together with the location-dependent error distribution functions. It is thus possible to determine different threshold values for different directions and thus different places. For example, a significantly larger threshold value can be determined for a place having lower integrity requirements, such as an ocean, than for a place having higher integrity requirements, such as an aircraft.

The SISA and SISMA in this new concept are dependent not only on the satellite position but also on the user position or direction extending from the satellite to the user.

As a status message, a signal can be sent indicating that the satellite signal cannot be used if the direction-dependent threshold value calculated accordingly for a defined direction is smaller than the estimated error of the navigation signal in this direction. The signal sent can include, for example, information that the estimated error for a defined region is larger than the threshold value calculated for this region. The signal sent can also indicate that a satellite signal is no longer intended to be used for navigation once the estimated error of the navigation signal is larger in one direction than the calculated threshold value for this direction.

According to a further embodiment of the invention, a utilization system, in particular a mobile navigation device that is designed for use with a method suggested by the invention and that is designed as described above, is provided for a satellite navigation system.

According to another embodiment of the invention, an apparatus is provided for optimizing status messages in a satellite navigation system, which comprises a space segment comprising a plurality of satellites that emit navigation signals to be received and evaluated by utilization systems for position determination. A ground segment includes a plurality of observation stations, which monitor the satellites. The apparatus is designed in such a way that a threshold value is determined, as a function of the location (of both the user and the satellite), for the message indicating that the error of a satellite is no longer acceptable.

The apparatus can be particularly designed for carrying out a method suggested by the invention.

Additional advantages and possible uses of the present invention will become apparent from the following description of the invention when considered in conjunction with the exemplary embodiment shown in the drawing.

BRIEF DESCRIPTION OF THE DRAWINGS

The single drawing FIGURE shows a satellite navigation system with an exemplary embodiment of an apparatus for the optimization of status messages according to the invention.

DETAILED DESCRIPTION OF THE INVENTION

Identical and/or functionally identical elements are provided with the same reference numbers in the following description.

The drawing FIGURE shows a satellite navigation system 10 comprising a space segment 12 and a ground segment 20. The space segment 12 comprises a plurality of satellites 14 which orbit the ground segment 20 on their respective orbits. Each satellite emits navigation signals 16 (SIS) which can be received by utilization systems 18, such as mobile navigation devices, and by observation stations 22 of the ground segment 20. The observation stations 22 are provided particularly for monitoring the satellites 14, and coordinating, for example, the integrity communication in the satellite navigation system 10. For this purpose, the observation stations evaluate the received navigation signals 16 by examining the data of a satellite 14 transmitted with each navigation signal 16, particularly the orbit and point in time at which the signal was generated as well as the structure of the signal. The observation stations 22 are further connected for communication purposes to a central control station 24, in which all measurement data of the observation stations 22 converge and are evaluated. Furthermore, the central control station 24 can control the emission of status messages 30 to the satellites 14 via observation stations 22. For this purpose, the station can actuate the transmission means 26 disposed in an observation station 22 to transmit status messages regarding the satellite navigation system 10, in particular regarding the SIS emitted by the satellites 14, to utilization systems 18 via the satellites 14. The status messages 30 can contain, as in the case of Galileo, information regarding the state of a satellite, for example, the Integrity Flag IF, which can indicate the status of a satellite as "Don't Use," "Not Monitored" or "OK" with a corresponding SISMA value.

In order to optimize the status messages in the satellite navigation system 10, the threshold value for the message indicating that the error of a satellite is larger than what is acceptable can be determined as a function of the location. This enables the selection of a smaller threshold value at the same false alarm probability in directions in which errors can be better observed, for example, in regions having densely arranged observation stations of the satellite navigation system. The location-dependent determination of the threshold value is effected similarly to the previous determination of the threshold value, with merely the overbounding being effected differently. If the overbounding was effected in such a way in previous integrity concepts of satellite navigation systems such as Galileo that a Gaussian-like function overbounds the error distribution or error distributions for all directions in which users can be located when seen from the satellite, then the overbounding is effected according to the invention individually for each direction and the threshold value is calculated accordingly. If the threshold value determined in this way for a direction is smaller than the estimated error in this direction, the satellite navigation signal can be indicated as not to be used. It is thus possible to increase the efficiency of the satellite navigation system regionally by installing several ground stations. Thus, for example, the efficiency of a satellite navigation system over Europe can be adjusted in such a way that it can be used for navigation in the case of landings by aircrafts, whereas only the efficiency for cross-country flights can be achieved over the oceans.

The location-dependent threshold value can be determined in a utilization system. According to the integrity concept of Galileo, the integrity risk can be calculated in a utilization system from the following information transmitted, in part, to a utilization system by the satellite:
  Integrity Flag;
  SISA value for each satellite;
  SISMA value for each satellite; and
  threshold value calculated from SISA and SISMA.

The threshold value $TH_i$ for each satellite i is calculated according to the following formula in the case of Galileo:

$$TH_i = kpFA * \text{sqr}(SISA_i\textasciicircum 2 + SISMA_i\textasciicircum 2),$$

where sqr denotes the root function and kpFA denotes the allowed false alarm probability and is typically 5.212.

As noted already in the introduction to the description, SISA is a prediction of the SISE distribution represented by a Gaussian distribution with the smallest standard deviation that is formed by overbounding the SISE distribution for fault-free SIS. As the SISE cannot be measured directly, it is estimated with the aid of measurements. This estimate of SISE is referred to as estimated SISE (SISEest). The difference between the actual SISE and SISEest, in turn, has a distribution, which is overbounded by a Gaussian distribution with a standard deviation called SISMA.

In order to enable the threshold value to be determined as a function of the location, different location-dependent $SISA_i(x)$ and $SISMA_i(x)$ for each satellite i can be transmitted to utilization systems according to the invention (the parameter x refers to the location dependence). Each utilization system is thus able to calculate, depending on its current position x, a suitable location-dependent threshold value according to the following formula:

$$THi(x)=kpFA*\text{sqr}(SISAi(x)^2+SISMAi(x)^2).$$

A utilization system can thus decide, depending on its position, when a SIS of a satellite i is classified as erroneous or acceptable.

SISAi(x) can be, for example, a function or a matrix describing the error ellipsoid, and is multiplied from the right and the left by the direction vector from the satellite to the user.

A matrix can also be selected for SISMAi(x), but there are also functions possible that calculate the estimation precision for the individual directions x from the coordinates of the observation stations and the availability of observations from these observation stations.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for optimization of status messages in a satellite navigation system, which comprises a space segment, comprising:
    emitting navigation signals from a plurality of satellites,
    receiving the navigation signals by both utilization systems for position determination and observation stations for navigation signal evaluation,
    monitoring the satellites with a ground segment comprising the observation stations, and
    determining a threshold value, as a function of location, for one of the status messages indicating that the error of a satellite is no longer acceptable and that the satellite is not to be used in the ground segment.

2. The method according to claim 1, wherein determination of the threshold value includes using location-dependent error distribution functions for describing an error of the satellite signal.

3. The method according to claim 2, wherein determination of the threshold value further includes calculating direction-dependent threshold values for the message indicating that the error of a satellite is no longer acceptable, together with the location-dependent error distribution functions.

4. A utilization system for a satellite navigation system that performs the method according to claim 1.

5. The utilization system according to claim 4, wherein the utilization system is a mobile navigation device.

6. An apparatus for optimization of status messages in a satellite navigation system, comprising:
    a space segment having a plurality of satellites that emit navigation signals,
    utilization systems for receiving the navigation signals for position determination,
    observation stations for receiving the navigation signals for navigation signal evaluation, and
    a ground segment comprising the observation stations, which monitor the satellites,
    wherein a threshold value is determined, as a function of location, for one of the status messages indicating that the error of a satellite is no longer acceptable and that the satellite is not to be used in the ground segment.

* * * * *